(12) United States Patent
Wu et al.

(10) Patent No.: US 10,041,684 B2
(45) Date of Patent: Aug. 7, 2018

(54) GAS SAFETY IGNITION SWITCH

(71) Applicant: SEVEN UNIVERSE INDUSTRIAL CO., LTD., Taichung (TW)

(72) Inventors: Sen-Yu Wu, Taichung Hsien (TW); Shu-Mei Liu, Taichung County (TW)

(73) Assignee: SEVEN UNIVERSE INDUSTRIAL CO., LTD., Taichung (TW)

( * ) Notice: Subject to any disclaimer, the term of this patent is extended or adjusted under 35 U.S.C. 154(b) by 354 days.

(21) Appl. No.: 14/955,380

(22) Filed: Dec. 1, 2015

(65) Prior Publication Data
US 2017/0059169 A1  Mar. 2, 2017

(30) Foreign Application Priority Data
Aug. 26, 2015  (TW) .............................. 104213881 U

(51) Int. Cl.
| F24C 3/12 | (2006.01) |
| F23N 1/00 | (2006.01) |
| F16K 35/02 | (2006.01) |

(52) U.S. Cl.
CPC .............. *F24C 3/12* (2013.01); *F16K 35/027* (2013.01); *F23N 1/007* (2013.01)

(58) Field of Classification Search
CPC ........... F16K 35/027; F23N 1/007; F24C 3/12
See application file for complete search history.

(56) References Cited

U.S. PATENT DOCUMENTS

| 6,229,104 B1* | 5/2001 | Matsui .................. H01H 25/06 200/18 |
| 2005/0034967 A1* | 2/2005 | Huber ....................... G05G 1/02 200/566 |
| 2012/0042745 A1* | 2/2012 | Hamm .................. H01H 19/03 74/553 |

FOREIGN PATENT DOCUMENTS

| DE | 4130939 A1 * | 3/1992 | ............. F23N 1/007 |
| FR | 2481417 A1 * | 10/1981 | ............. F23Q 3/002 |
| WO | WO 2008135839 A2 * | 11/2008 | ............. F23N 1/005 |

* cited by examiner

*Primary Examiner* — Kenneth Rinehart
*Assistant Examiner* — Logan Jones
(74) *Attorney, Agent, or Firm* — Jackson IPG PLLC; Demian K. Jackson

(57) ABSTRACT

The present invention provides a gas safety ignition switch, comprising components of a gas switch body, a closer unit, a rotary knob unit, a presser, a micro switch and an electronic ignition device, characterized in that: one side of the gas switch body is configured with an opening, the opening being corresponding to an actuation point of the micro switch and the spindle, an actuator, configured inside the opening in a movable manner, including an contacting end and a pushing end, the pushing end being corresponding to the actuation point of the micro switch; the edge of the driving diaphragm is also configured with an indentation corresponding to one end of the actuator; thus, when pressing the spindle of the rotary knob unit, the driving diaphragm can move so that the contacting end of the actuator will be right inside the indentation, and when turning the spindle, the driving diaphragm will turn synchronously to tightly push against the contacting end, and will push the actuator to further drive the micro switch, so that the electronic ignition device can ignite the gas.

10 Claims, 8 Drawing Sheets

GAS SAFETY IGNITION SWITCH

BACKGROUND OF INVENTION

1. Field of the Invention

The present invention relates generally to a gas switch, and more particularly to a gas safety ignition switch, which can avoid accidental ignition caused by mistake pressing by children as well as repetitive ignitions.

2. Description of Related Art

To realize one-time ignition, most existing gas switches are configured with an electronic ignition device and a micro switch that is electrically connected with the electronic ignition device. There are also additional configurations of an actuator or a presser that is linked with the spindle of the rotary knob unit as well as the micro switch, so that, when the user presses the rotary knob unit, through the actuator or displacement of the presser, the actuation point of the micro switch will be touched to start the micro switch, which will cause the electronic ignition device to generate a spark and ignite the gas exported from the gas switch. Thus, the gas switch can complete ignition at once. As there are many related patents, no more detailed descriptions are given here.

The structural design for one-time ignition can enhance operational convenience of the gas switch, but, as the ignition method is too easy, the gas might be ignited accidentally through mistake pressing by playful children, resulting in risks unnoticed by adults. In addition, when the user turns the spindle to adjust the fire, if the spindle is pressed by mistake, there will be repetitive ignitions.

Thus, to overcome the aforementioned problems of the prior art, it would be an advancement in the art to provide an improved structure that can significantly improve the efficacy.

Therefore, the inventor has provided the present invention of practicability after deliberate design and evaluation based on years of experience in the production, development and design of related products.

SUMMARY OF THE INVENTION

The main objective of the present invention is to provide a gas safety ignition switch that can overcome the above-mentioned shortcomings, so that, when the rotary knob unit is pressed, ignition will not happen. Thus, risks of mistake pressing and ignition by children can be avoided. The product will be safer. Moreover, the invention can also avoid repetitive ignitions caused by mistake pressing on the rotary knob unit during adjustment of the fire. This also adds to the practical value.

Therefore, to realize the above-mentioned object, the present invention provides a gas safety ignition switch, comprising components of a gas switch body, a closer unit, provided inside the gas switch body, a rotary knob unit, provided on one end of the gas switch body and connected with the closer unit, including a spindle that can be turned to drive the closer unit, a driving diaphragm, provided on the spindle of the rotary knob unit, a micro switch, provided on one side of the gas switch body, and an electronic ignition device electrically connected with the micro switch; its characteristics lie in that: one side of the gas switch body is configured with an opening, the opening being corresponding to an actuation point of the micro switch and the spindle; an actuator, configured inside the opening in a movable manner, including an contacting end and a pushing end, the pushing end being corresponding to the actuation point of the micro switch; the edge of the driving diaphragm is also configured with an indentation corresponding to one end of the actuator.

BRIEF DESCRIPTION OF THE DRAWINGS

Further benefits and advantages of the present invention will become apparent after a careful reading of the detailed description with appropriate reference to the accompanying drawings.

DETAILED DESCRIPTION OF THE INVENTION

Figure 1:
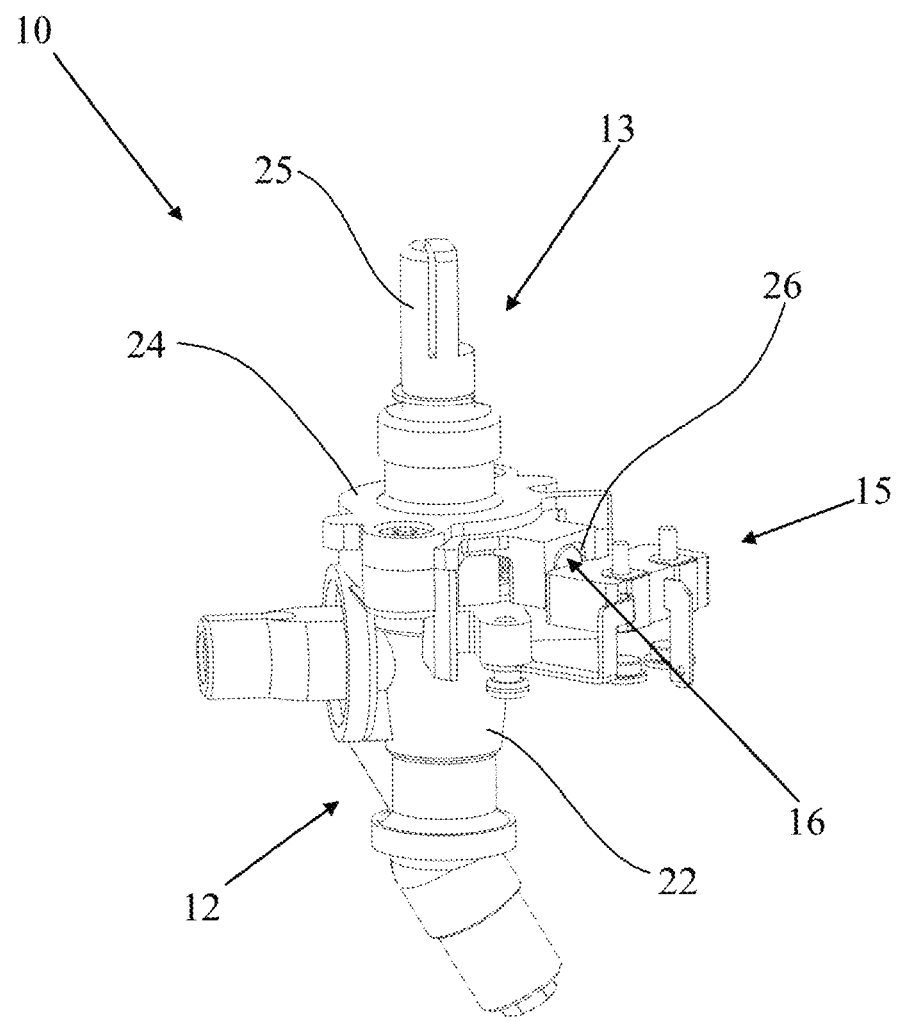
FIG. 1 is a perspective view of one preferred embodiment of the present invention.
Figure 2:
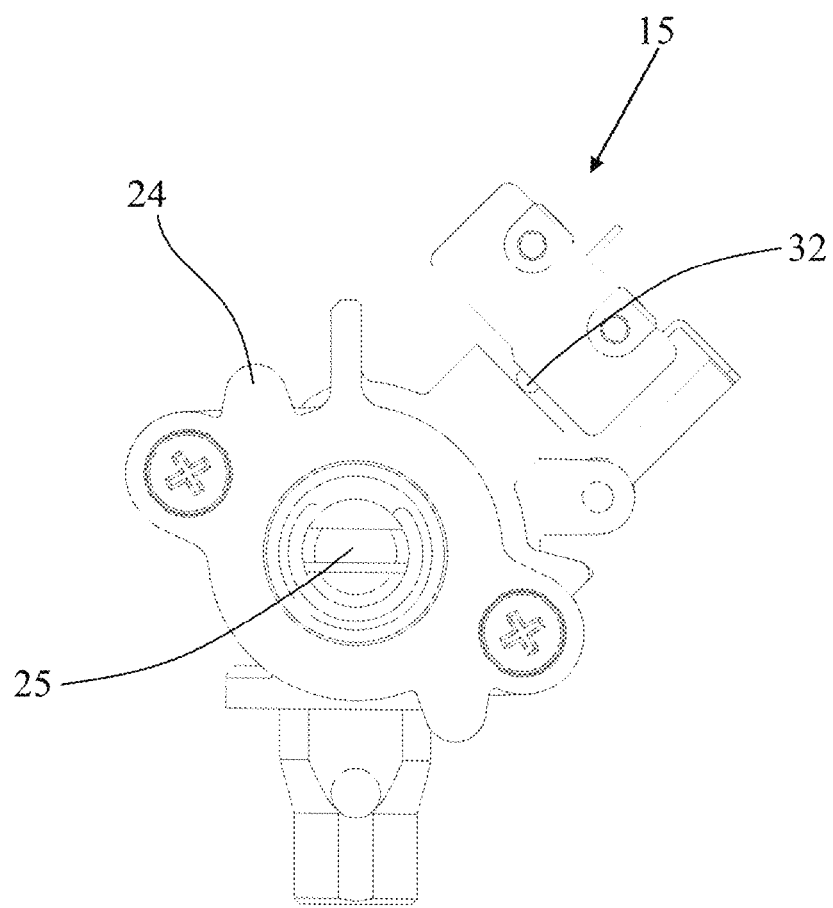
FIG. 2 is a top view of FIG. 1.
Figure 3:
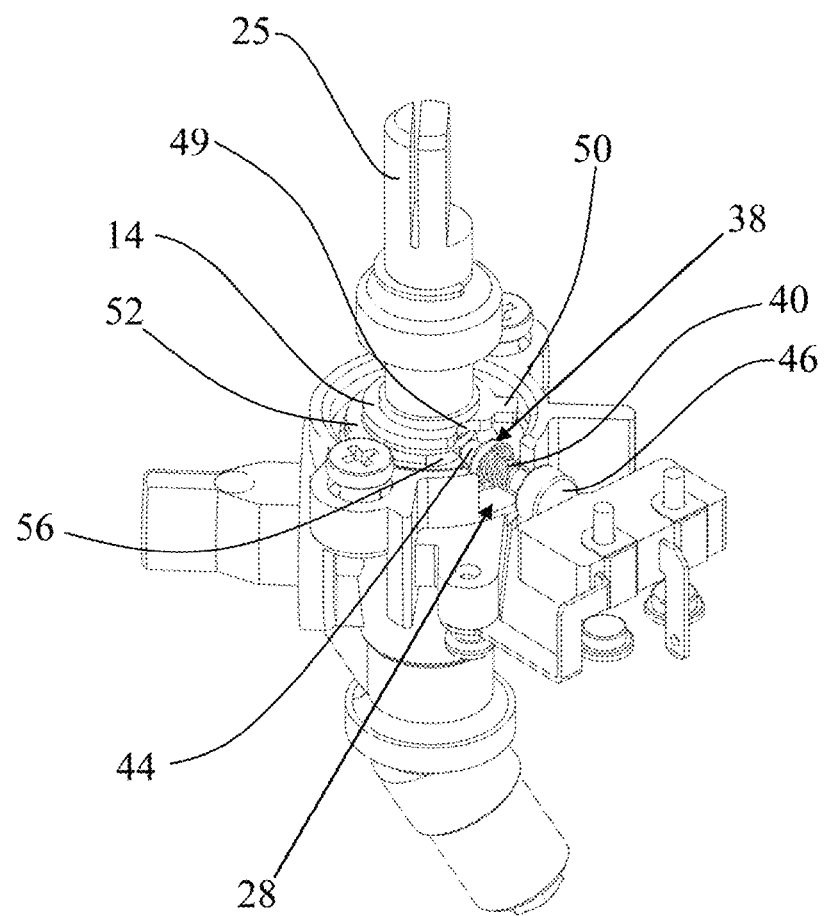
FIG. 3 is a perspective view of one preferred embodiment of the present invention with the cover omitted to indicate the space relation between the driving diaphragm and the actuator.
Figure 4:
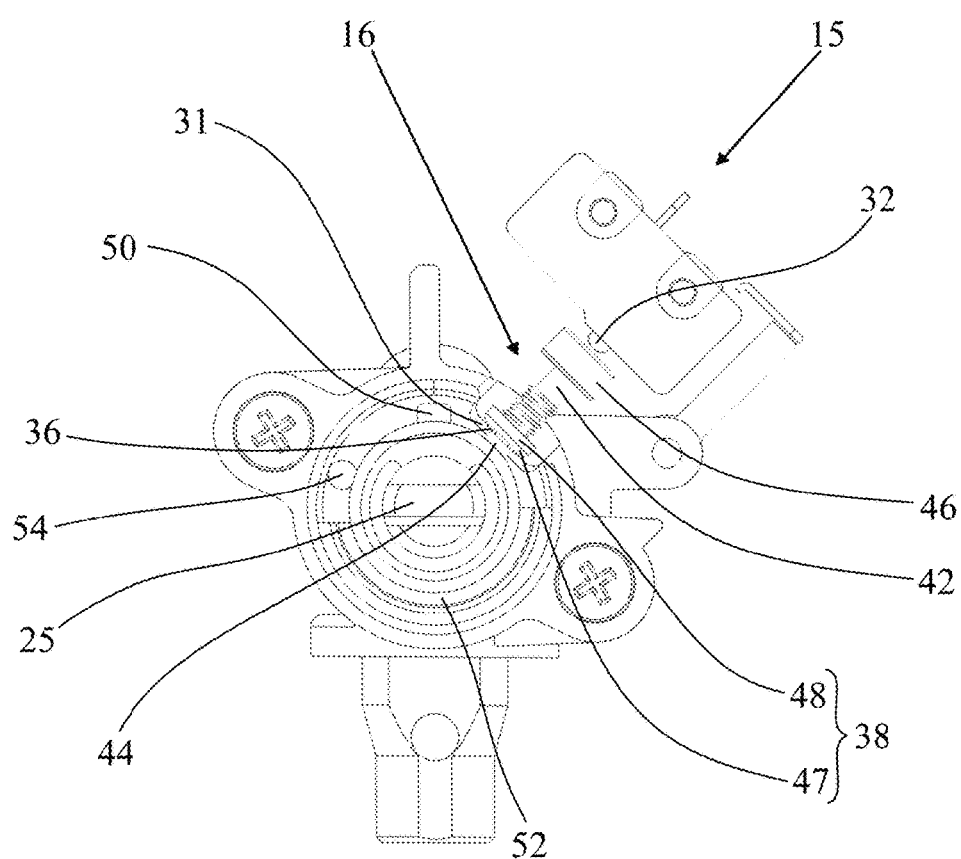
FIG. 4 is a top view of FIG. 3.

Firstly, referring to FIG. 1 to FIG. 4, the gas safety ignition switch 10 of one preferred embodiment of the present invention comprises components of a gas switch body 12, a rotary knob unit 13, a driving diaphragm 14, a micro switch 15 and a closer unit, and an electronic ignition device, wherein, the closer unit and electronic ignition device are not shown in the drawings. The gas switch body 12 is made up of a base 22 and a cover 24 locking each other. The base 22 is configured with a chamber to house the closer unit. The rotary knob unit 13 is configured inside the cover 24 and is connected with the closer unit, including a spindle 25 that can be turned to drive the closer unit; the above components are all prior art, so their structures and functions are not detailed here. The characteristics of the gas ignition switch 10 of the present invention lie in:

The edge of the base 22 is configured with a notch 26, the position on the cover 24 corresponding to the notch 26 is configured with a port 28, and the notch 26 and the port 28 are communicated to form an opening. The opening is corresponding to an actuation point 32 of the micro switch 15 and the spindle 25. Furthermore, the position on the inner side of the base 22 corresponding to the notch 26 is configured with an indentation 31.

An actuator 16, including a shifting bar 34, an abutting piece 36, a disc 38 and an elastic piece 40. The shifting bar 34 is equipped inside the opening 30 in a movable manner, having a shaft 42. The two ends of the shaft 42 are respectively configured with a contacting end 44 and a pushing end 46. The surface of the contacting end 44 has an appropriate curve, protruding to the notch 26 and corresponding to the spindle 25. The pushing end 46 is a cylindrical block with its outer diameter larger than the shifting bar 34, protruding out of the port 28 and corresponding to the actuation point 32. The abutting piece 36 is a C-shaped ring, embedded inside the slot (not shown in the drawing) provided on one end of the shaft 42. The disc 38 has a disc portion 47 and a folded edge 48. The disc portion 47 is configured on the shaft 42 and corresponding to the abutting piece 36. The folded edge 48 is folded and formed on the side of the disc portion 46 facing the pushing end 46. The elastic piece 40 is a spring, sheathing the shaft 42 and positioned between the inner wall of the cover 24 and the disc portion 47, so that when the shifting bar 34 is not under a force, the abutting piece 36 will push against the inner side of the indentation 31, and the pushing end 46 will not contact the actuation point 32.

Moreover, the position of the driving diaphragm 14 configured on the spindle 25 is higher than the actuator 16, and its edge is configured with an indentation 49 and a protruding block 50 located on the side of the indentation 49. The indentation 49 is corresponding to the contacting end 44 when the spindle 25 is not turned. The protruding block 50 protrudes out of the edge of the driving diaphragm 14 for an appropriate length.

In addition, the side of the base 22 facing the cover 24 is further configured with a ring-shaped protruding blocking portion 52, located on the side of the spindle 25. When the spindle 25 is not pressed, the driving diaphragm 14 is located above the blocking portion 52, while when the spindle 25 is pressed, the driving diaphragm 14 will move downward to the inner side of the blocking portion 52, so that the contacting end 44 of the actuator 16 is right inside the indentation 49, in an un-contacting state. When turning the spindle 25 for a preset angle (e.g. 90 degrees), the protruding block 50 can push against one end of the blocking portion 52. Moreover, the inner side of the cover 24 is further riveted with a blocking piece 54, being a ball, slightly protruding to one side of the driving diaphragm 14.

Figure 5:
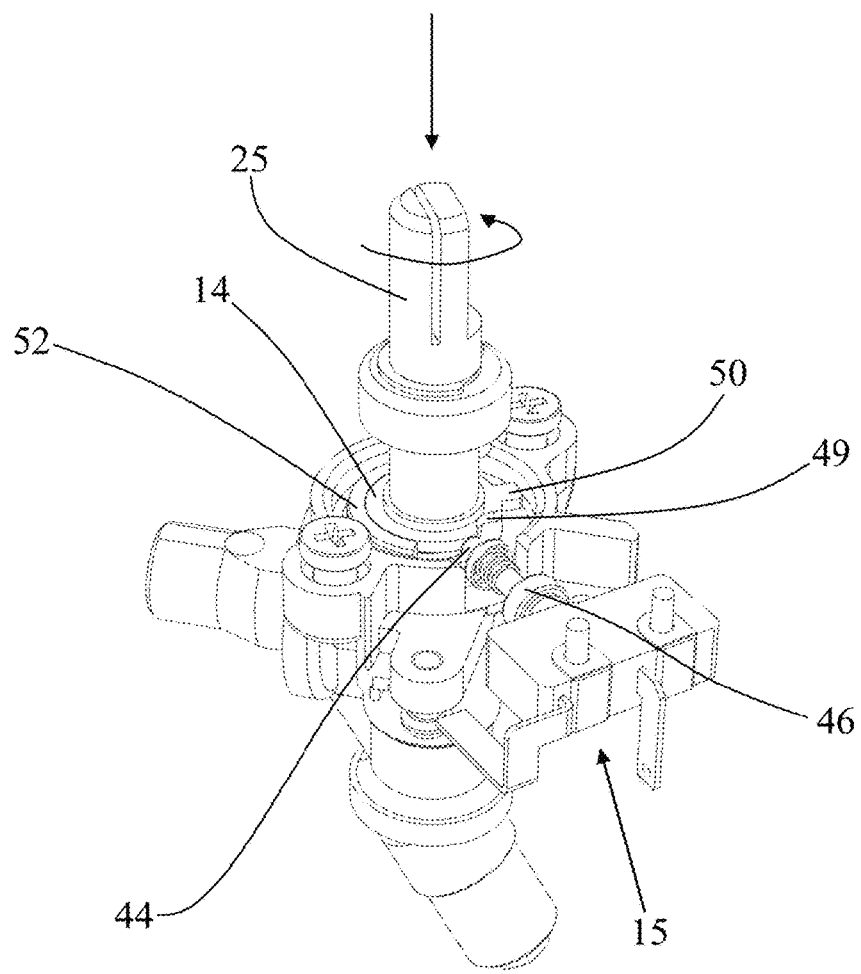
FIG. 5 is an operational view of one preferred embodiment of the present invention, to indicate the space relation between the driving diaphragm and the actuator when the spindle is pressed and turned counterclockwise.
Figure 6:
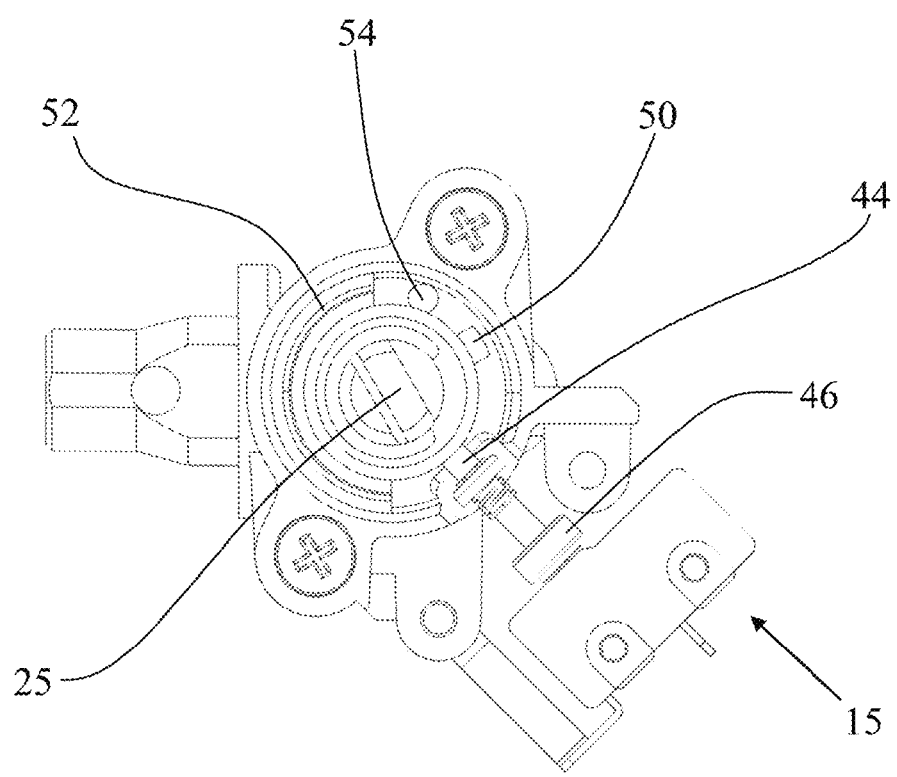
FIG. 6 is a top view of FIG. 5.

Based on coordination of the above components, the gas safety ignition switch 10 of the present invention has the following operating method, features and efficacies:

To ignite the gas, press the spindle 25, the driving diaphragm 14 will fall along with the spindle 25. At this time, the contacting end 44 of the actuator 16 is located inside the indentation 49. Therefore, the driving diaphragm 14 does not contact the actuator 16, and the micro switch 15 is not driven by the actuator 16, so the electronic ignition device will not conduct the ignition action. When pressing the spindle 25 and turning it counterclockwise (0 to 90 degrees), the driving diaphragm 14 will turn and its edge will push against the contacting end 44, push the actuator 16, and subsequently the moving actuator 16 will push the actuation point 32, as shown in FIG. 5 and FIG. 6, so that the micro switch 15 will be activated to cause the electronic ignition device to generate a spark to ignite the gas. Particularly, when the spindle 25 is turned to 90 degrees, the protruding block 50 will push against one end of the blocking portion 52, so that the spindle 25 can no longer turn. In this way, during ignition, the turning angle of the spindle 25 can be limited.

Figure 7:
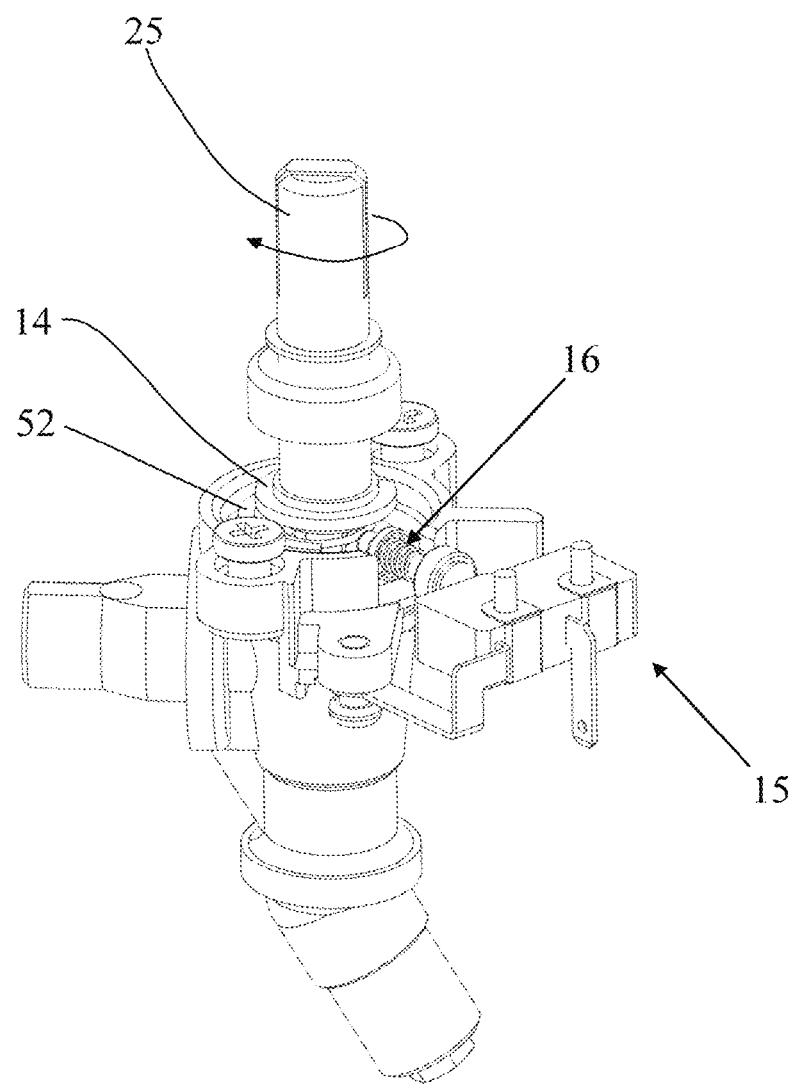
FIG. 7 is an operational view of one preferred embodiment of the present invention, to indicate the space relation between the driving diaphragm and the actuator when the spindle is turned clockwise.
Figure 8:
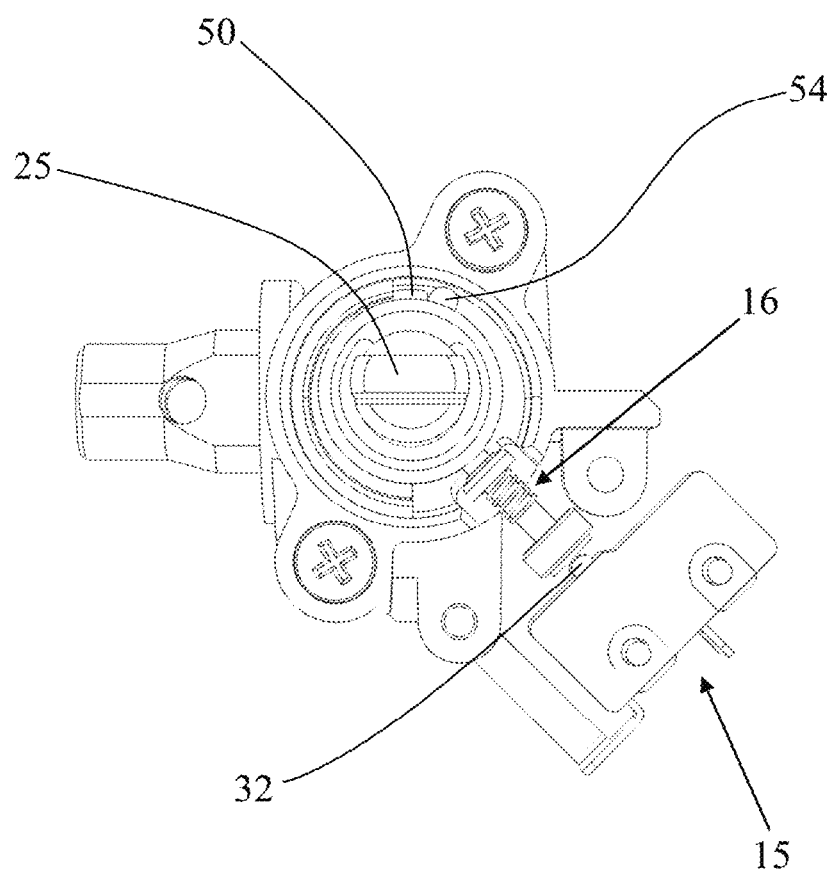
FIG. 8 is a top view of FIG. 7.

After ignition, the user does not need to press the spindle 25 again. The spindle 25 and the driving diaphragm 14 can be pushed by the spring 56 inside the rotary knob unit 13 to rise. At this time, the user can turn the spindle 25 to change the output volume of the gas and adjust the fire, just like the prior-art gas switches. To extinguish the fire, turn the spindle 25 clockwise to reset, as shown in FIG. 7 and FIG. 8. When the spindle 25 is turned to the position of approximately 90 degrees, the protruding block 50 will have a friction, and slide across the blocking piece 54. The friction between the components will generate a feeling of interference, reminding the user that the gas safety ignition switch 10 is being turned off.

Particularly, when the ignition is completed and the spindle 25 is no longer pressed, the shifting bar 34 will reset under the tension of the elastic piece 40, and the contacting end 44 will protrude to the bottom side of the driving diaphragm 14. When the user turns the spindle 25 to adjust the fire, even if the spindle 25 is pressed by mistake, the driving diaphragm 14 will also be blocked by the contacting end 44 and cannot move downward. Hence, the actuator 16 and micro switch 15 will not be pushed to cause repetitive ignitions.

From the above, it is known that the gas safety ignition switch of the present invention realizes an effect to avoid activation of the micro switch and electronic ignition device and consequent ignition when pressing the rotary knob unit through the coordination of the actuator and the driving diaphragm. This is different from the press-and-ignite design of prior-art gas ignition switches, and can avoid risks of mistake pressing and ignition by children. The safety performance is better. In addition, after ignition, even if the user presses the spindle by mistake, repetitive ignitions will not happen; therefore, the present invention meets the requisites of utility model patents and has an application is submitted.

What is claimed is:

1. A gas safety ignition switch, comprising components of a gas switch body, a closer unit, provided inside the gas switch body, a rotary knob unit, provided on one end of the gas switch body and connected with the closer unit, including a spindle that can be turned to drive the closer unit, a driving diaphragm, provided on the spindle of the rotary knob unit, a micro switch, provided on one side of the gas switch body, and an electronic ignition device electrically connected with the micro switch; its characteristics lie in that:

one side of the gas switch body is configured with an opening, the opening being corresponding to an actuation point of the micro switch and the spindle;

an actuator, configured inside the opening in a movable manner, including an contacting end and a pushing end, the contacting end being corresponding to the spindle, and the pushing end being corresponding to the actuation point of the micro switch;

the edge of the driving diaphragm is also configured with an indentation corresponding to one end of the actuator;

thus, when pressing the spindle of the rotary knob unit, the driving diaphragm can move downward so that the contacting end of the actuator will be right inside the indentation, and will not push the actuator; and when turning the spindle, the driving diaphragm will turn synchronously to tightly push against the contacting end, and will push the actuator to further drive the micro switch, so that the electronic ignition device can ignite the gas; when ignition is completed and the spindle is no longer pressed, the driving diaphragm will move upward, the shifting bar will be reset through elasticity, and the contacting end can protrude to the bottom side of the driving diaphragm, to block the driving diaphragm moving downward, so as to avoid repetitive ignitions caused by mistake pressing on the spindle.

2. The device defined in claim 1, wherein said gas switch body includes a base, the base being to house the closer unit, a cover, covering one end of the base to seal the chamber, the rotary knob unit being configured on the cover, the edge of the base being configured with a notch, the position on the cover corresponding to the notch is configured with a port, and the notch and the port are communicated to form an opening.

3. The device defined in claim 2, wherein said actuator includes a shifting bar, equipped inside the opening in a movable manner, said contacting end and pushing end being configured on the two ends of the shifting bar, an abutting piece, configured on the shifting bar and positioned between the contacting end and the pushing end, an elastic piece, located between the inner wall of the cover and the abutting piece, so that when the shifting bar is not pushed, the pushing end will not contact the actuation point.

4. The device defined in claim 3, wherein a further disc is configured between the elastic piece and the abutting piece, the disc being positioned between the elastic piece and the abutting piece, the position on the inner side of the base corresponding to the notch is configured with an indentation, the disc being pushed by the elastic piece so that the abutting piece will push against the inner side of the indentation.

5. The device defined in claim 4, wherein said disc includes a disc portion and a folded edge, the elastic piece pushing against the disc portion, while the folded edge being folded and formed on the side of the disc portion facing the elastic piece.

6. The device defined in claim 3, wherein the surface of the contacting end has an appropriate curve, and the pushing end is a cylindrical block with its outer diameter larger than the shifting bar.

7. The device defined in claim 2, wherein the edge of the driving diaphragm is further configured with a protruding block, located on the side of the indentation; the inside of the base is further provided with a blocking portion, so that, when the spindle is pressed down and turned to 90 degrees, the blocking portion will push against the protruding block, and the spindle cannot turn further; in this way, during ignition, the turning angle of the spindle can be limited.

8. The device defined in claim 7, wherein the blocking portion is configured in a protruding manner on the side of the base facing the cover, and is located on the outer side of the spindle; when the spindle is not under a force, the driving diaphragm is located above the blocking portion.

9. The device defined in claim 2, wherein the inner side of the cover is further configured with a blocking piece located on the outer side of the driving diaphragm.

10. The device defined in claim 9, wherein the blocking piece is riveted on the inner side of the cover.

* * * * *